United States Patent
Nielsen et al.

(10) Patent No.: US 11,582,631 B2
(45) Date of Patent: Feb. 14, 2023

(54) USER EQUIPMENT INDICATION FOR ADAPTIVE SCHEDULING RESTRICTIONS

(71) Applicant: NOKIA TECHNOLOGIES OY, Espoo (FI)

(72) Inventors: Sari Kaarina Nielsen, Espoo (FI); Ingo Viering, Munich (DE); Daniela Laselva, Klarup (DK); Subramanya Chandrashekar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 114 days.

(21) Appl. No.: 17/230,799

(22) Filed: Apr. 14, 2021

(65) Prior Publication Data
US 2022/0338045 A1   Oct. 20, 2022

(51) Int. Cl.
*H04W 24/10* (2009.01)
*H04W 8/24* (2009.01)
*H04W 72/12* (2009.01)
*H04W 56/00* (2009.01)

(52) U.S. Cl.
CPC .............. *H04W 24/10* (2013.01); *H04W 8/24* (2013.01); *H04W 56/001* (2013.01); *H04W 72/1263* (2013.01)

(58) Field of Classification Search
CPC ..... H04W 24/10; H04W 8/24; H04W 56/001; H04W 72/1263
See application file for complete search history.

(56) References Cited

U.S. PATENT DOCUMENTS

| | | | |
|---|---|---|---|
| 2018/0324678 A1 | 11/2018 | Chen et al. | |
| 2019/0037425 A1* | 1/2019 | Hong | H04W 24/08 |
| 2019/0174466 A1* | 6/2019 | Zhang | H04L 5/005 |
| 2019/0254110 A1* | 8/2019 | He | H04L 41/0896 |
| 2020/0029274 A1 | 1/2020 | Cheng et al. | |
| 2020/0137602 A1* | 4/2020 | Zhang | H04W 72/042 |
| 2020/0344686 A1* | 10/2020 | Venugopal | H04W 72/14 |

(Continued)

FOREIGN PATENT DOCUMENTS

| | | | | |
|---|---|---|---|---|
| WO | WO-2019219162 A1 * | 11/2019 | ........... | H04B 7/0617 |
| WO | 2020029200 A1 | 2/2020 | | |

(Continued)

OTHER PUBLICATIONS

3GPP TSG RAN WG1 #96b, R1-1904861; "MPUE and Panel Specific Uplink Transmission" Xi'an, China; Apr. 8-12, 2019, 5 pages.

(Continued)

*Primary Examiner* — Chi H Pham
*Assistant Examiner* — Vladislav Y Agureyev
(74) *Attorney, Agent, or Firm* — Brake Hughes Bellermann LLP

(57) ABSTRACT

Improved techniques of managing measurement gaps for MPUEs include identifying an idle time for the UE in a coordinated and network-controlled manner during which the UE is able to perform SSB/CSI-RS based measurements for a serving cell using non-serving panels. Such idle time is defined as an omitted operation time (i.e., an idle time of a certain pre-defined length) in which the network has to apply the scheduling restrictions in the SSBs' symbols to the UE. Note that currently as per the RAN4 requirements, the network must apply scheduling restrictions in all SSB symbols for all UEs in FR2 at any time (i.e., worst case scenario).

24 Claims, 9 Drawing Sheets

(56) References Cited

U.S. PATENT DOCUMENTS

| | | | |
|---|---|---|---|
| 2020/0350976 A1 | 11/2020 | Bai et al. | |
| 2020/0359197 A1* | 11/2020 | Venugopal | H04W 76/27 |
| 2021/0144573 A1* | 5/2021 | Yoon | H04B 7/0695 |
| 2021/0297959 A1* | 9/2021 | Zhou | H04B 7/0602 |
| 2022/0166468 A1* | 5/2022 | Go | H04L 5/00 |
| 2022/0287142 A1* | 9/2022 | Li | H04L 1/0025 |

FOREIGN PATENT DOCUMENTS

| | | |
|---|---|---|
| WO | 2020037207 A1 | 2/2020 |
| WO | WO-2022151058 A1 * | 7/2022 |

OTHER PUBLICATIONS

Li et al., "Power Saving Techniques for 5G and Beyond", IEEE Access; vol. 8; Jun. 9, 2020; pp. 108675-108690.

* cited by examiner

USER EQUIPMENT INDICATION FOR ADAPTIVE SCHEDULING RESTRICTIONS

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes transmitting, to a network node via an antenna panel of a plurality of antenna panels, idle time activation data indicating an idle time at specified instances of time during which reception from and/or transmission to the network node are ignored.

According to an example implementation, an apparatus includes at least one processor and at least one memory including computer program code, the at least one memory and the computer program code configured to, with the at least one processor, cause the apparatus at least to transmit, to a network node via an antenna panel of a plurality of antenna panels, idle time activation data indicating an idle time at specified instances of time during which reception from and/or transmission to the network node are ignored.

According to an example implementation, an apparatus includes means for transmitting, to a network node via an antenna panel of a plurality of antenna panels, idle time activation data indicating an idle time at specified instances of time during which reception from and/or transmission to the network node are ignored.

According to an example implementation, a computer program product includes a computer-readable storage medium and storing executable code that, when executed by at least one data processing apparatus, is configured to cause the at least one data processing apparatus to transmit, to a network node via an antenna panel of a plurality of antenna panels, idle time activation data indicating an idle time at specified instances of time during which reception from and/or transmission to the network node are ignored.

According to an example implementation, a method includes receiving, by a network node from a multi-panel user equipment (MPUE) that includes a plurality of antenna panels, idle time activation data indicating an idle time at specified instances of time during which transmission to and/or reception from the network node are ignored by the MPUE; and generating schedule data, the schedule data indicating that (i) during the specified instances of time, data symbols and/or control symbols are not to be transmitted to the MPUE and (ii) outside of the specified instances of time, data symbols and/or control symbols are to be transmitted to the MPUE.

According to an example implementation, an apparatus includes at least one processor and at least one memory including computer program code, the at least one memory and the computer program code configured to, with the at least one processor, cause the apparatus at least to receive, by a network node from a multi-panel user equipment (MPUE) that includes a plurality of antenna panels, idle time activation data indicating an idle time at specified instances of time during which transmission to and/or reception from the network node are ignored by the MPUE; and generate schedule data, the schedule data indicating that (i) during the specified instances of time, data symbols and/or control symbols are not to be transmitted to the MPUE and (ii) outside of the specified instances of time, data symbols and/or control symbols are to be transmitted to the MPUE.

According to an example implementation, an apparatus includes means for receiving, by a network node from a multi-panel user equipment (MPUE) that includes a plurality of antenna panels, idle time activation data indicating an idle time at specified instances of time during which transmission to and/or reception from the network node are ignored by the MPUE; and means for, generating schedule data, the schedule data indicating that (i) during the specified instances of time, data symbols and/or control symbols are not to be transmitted to the MPUE and (ii) outside of the specified instances of time, data symbols and/or control symbols are to be transmitted to the MPUE.

According to an example implementation, a computer program product includes a computer-readable storage medium and storing executable code that, when executed by at least one data processing apparatus, is configured to cause the at least one data processing apparatus to receive, by a network node from a multi-panel user equipment (MPUE) that includes a plurality of antenna panels, idle time activation data indicating an idle time at specified instances of time during which transmission to and/or reception from the network node are ignored by the MPUE; and generate schedule data, the schedule data indicating that (i) during the specified instances of time, data symbols and/or control symbols are not to be transmitted to the MPUE and (ii) outside of the specified instances of time, data symbols and/or control symbols are to be transmitted to the MPUE.

The details of one or more examples of implementations are set forth in the accompanying drawings and the description below. Other features will be apparent from the description and drawings, and from the claims.

DETAILED DESCRIPTION

Figure 1:
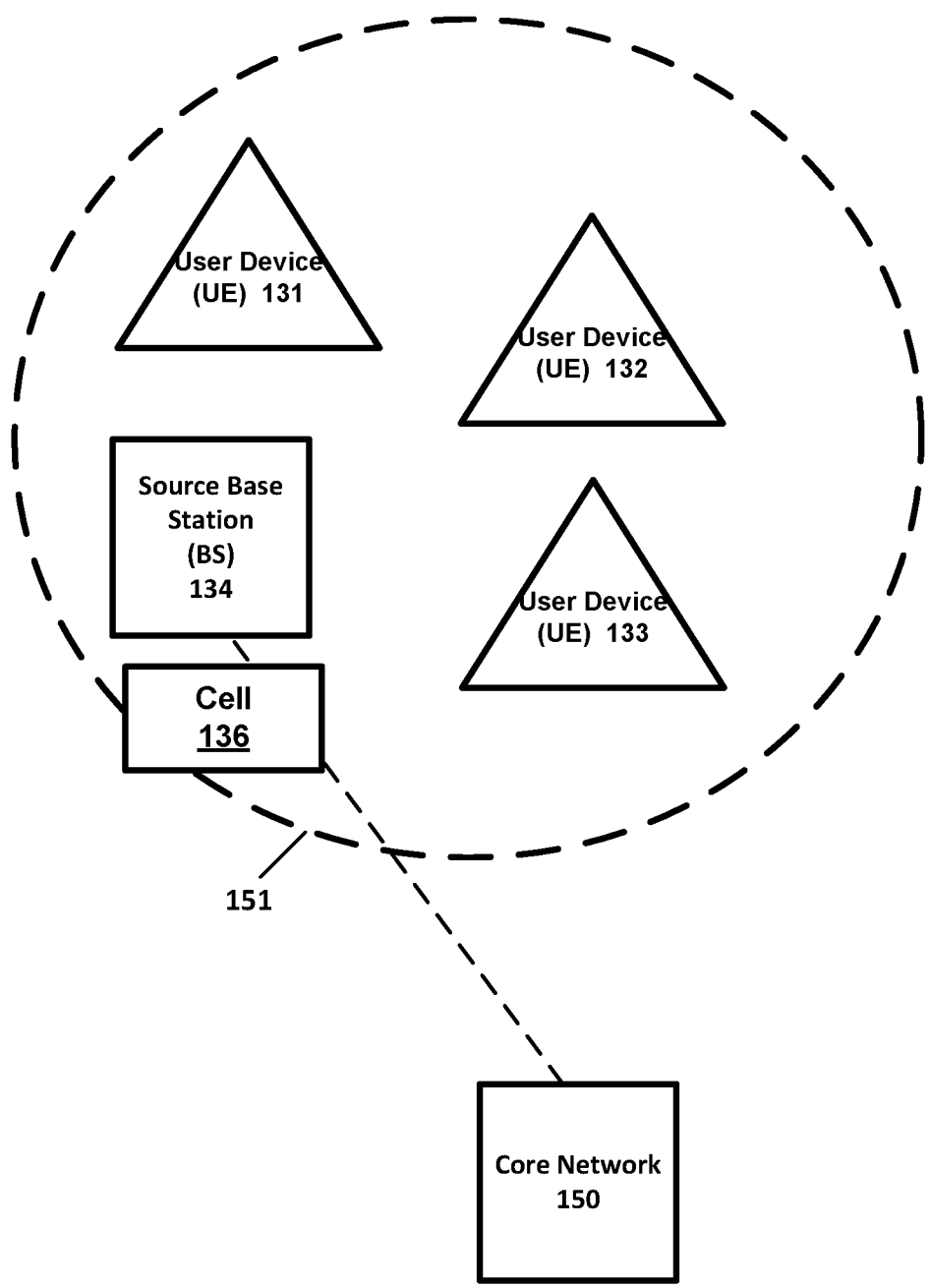
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) also may be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

In frequency range 2 (FR2), which includes bands in the range 24.25-52.6 GHz, both the g-node B (gNB) and user equipment (UE) are expected to operate using "narrow" beams. This means the gNB operates using radiation patterns narrower than sector-wide beams as in LTE. Likewise, the UE operates using radiation patterns narrower than omni-directional beams. The reasons for the beam-based operations depend on the need for an increased array/antenna gain to compensate the higher path loss at frequencies within FR2 or above, but also due to technological limitations. For instance, the achievable power amplifier (PA) output power decreases as a function of the carrier frequency for any PA technology class, and when going to higher carrier frequencies more and more of the effective isotropic radiated power (EIRP) needs to be provided with an increased antenna/array gain. That can be achieved indeed by narrowing the radiation patterns, i.e., using narrow beams/directions.

Figure 2:
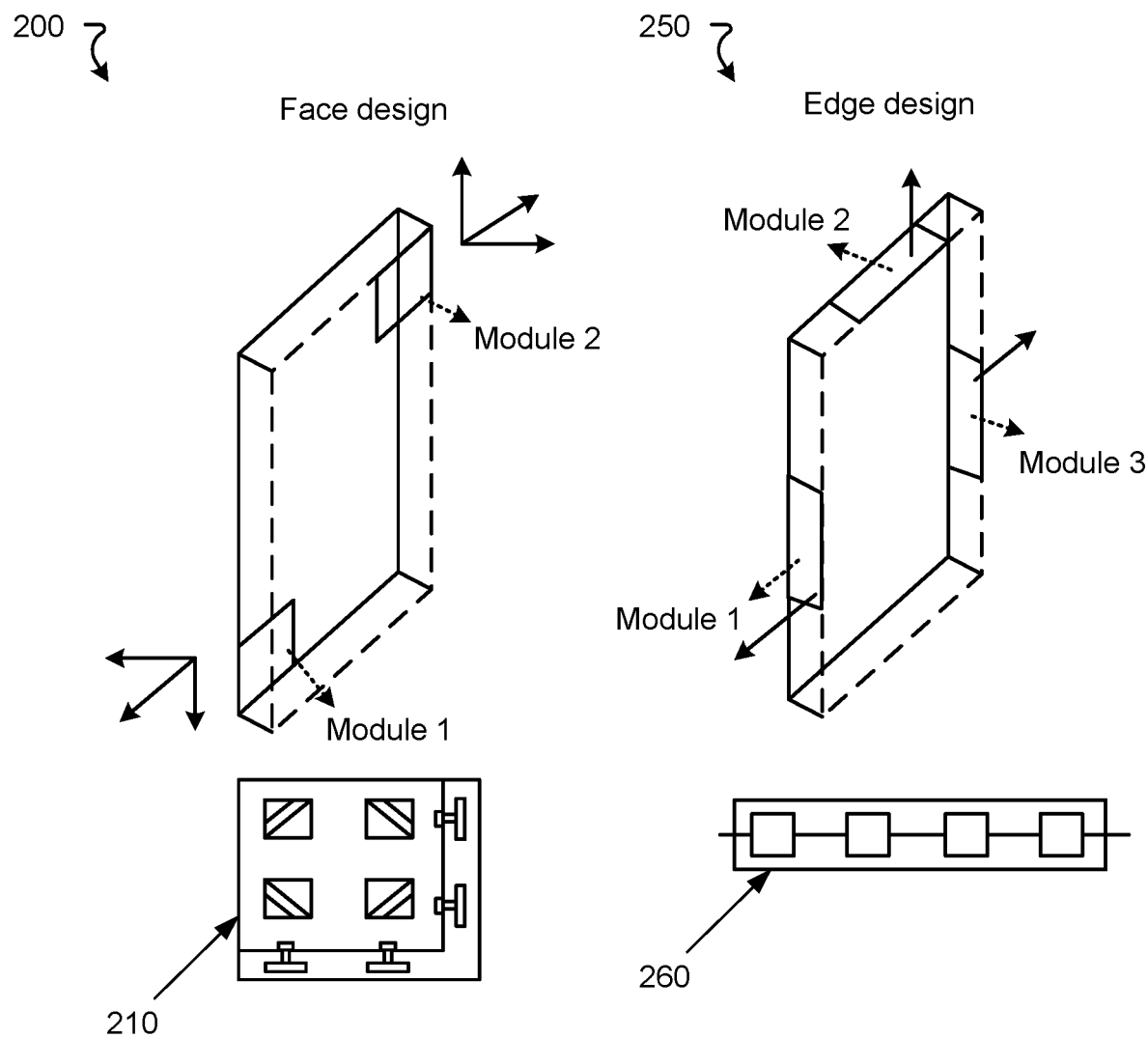
FIG. 2 is a diagram illustrating face and edge designs, antenna panel structure, and boresight directions of the main scanning planes of all subarrays, according to an example implementation.

Moreover, a 5G UE is expected to have multiple antenna panels (modules) to produce a multi-panel UE (MPUE), disposed at different locations within the UE when operating at FR2 or at higher frequencies in order to compensate for the additional path loss as compared to FR1. Various assumptions about the disposition of the panels as well as whether multiple panels can be active at a time have been made in 3GPP and academia. In Rel-16, the working assumption, referred to as "MPUE-Assumption3", has been that multiple panels can be active simultaneously but only one panel can be used for uplink transmission. It is up to UE implementation in Rel-16 how to do perform panel selection/switching. For example, FIG. 2 illustrates an "edge panel design," 250 having linear dual-polarized patch subarrays 260 placed on three edges of the UE as shown in FIG. 2, is preferred as compared to the "face design" 200/210 due its better tradeoff between power consumption, implementation ease, and minimal exposure related challenges.

Some aspects to note about an MPUE as per the current state of affairs in 3GPP are provided below.

The UE's panel domain is (almost) completely hidden from gNB in Rel-16.

Antenna panel selection is completely up to UE implementation in Rel-16 (including, e.g., activation/deactivation, panel switch).

In Rel-16 there is no capability/indication regarding no. of receive (RX) panels of the UE. There is only a subtle hint regarding how many transmit (TX) panels the UE may have; for example, maxNumberSimultaneousSRS-ResourceTx IE hints at how many TX panels the UE may have (1, 2, 4).

Multi-panel UEs (MPUEs) have been classified by 3GPP in the Rel-16 WI on eMIMO according to their capabilities in the following categories:

MPUE-Assumption 1: Multiple panels are employed at the UE but only one panel can be activated at a time, entailing a panel switching/activation delay, e.g., 3 ms.

MPUE-Assumption 2: Multiple panels are employed at the UE and multiple panels can be activated at a time, and one or more panels can be used for transmission.

MPUE-Assumption 3: Multiple panels are employed at the UE and multiple panels can be activated at a time, but only one panel can be used for reception.

In light of the above categories, UEs that follow MPUE-Assumption 1 are not capable to measure the serving cell's or neighbour cell's synchronization signal block (SSB) bursts from multiple panels at a time. Instead, in conventional approaches to managing measurement gaps for MPUEs, these UEs may perform the synchronization signal-reference signal receive power (SS-RSRP) measurements from each panel in a time interleaved fashion. Although the focus in Rel-16 has been on MPUE-Assumption 3, enhancements for MPUE-Assumption 1 and MPUE-Assumption 2 may follow.

The above-described conventional approaches to managing measurement gaps for MPUEs suffer from deficiencies. For example, since the network is unaware of the UE's panel domain, it is implicit that the network is also unaware of the activation status of the panels and number of active panels. This may impact the gNB scheduling and its outcome for certain MPUEs (e.g., MPUE-Assumption1). For example, because of its unawareness, the network may send data to the UE over the orthogonal frequency-division multiplexed (OFDM) symbols carrying SSBs, while the UE is doing SSB measurements on a non-serving panel, from which the serving beam does not have sufficient quality to monitor for physical downlink control/shared channel (PDCCH/PDSCH). This may lead to UE losing data, potentially affecting the user plane and/or control plane, and in turn wasting radio resources and energy at the network side as well.

Figure 3:
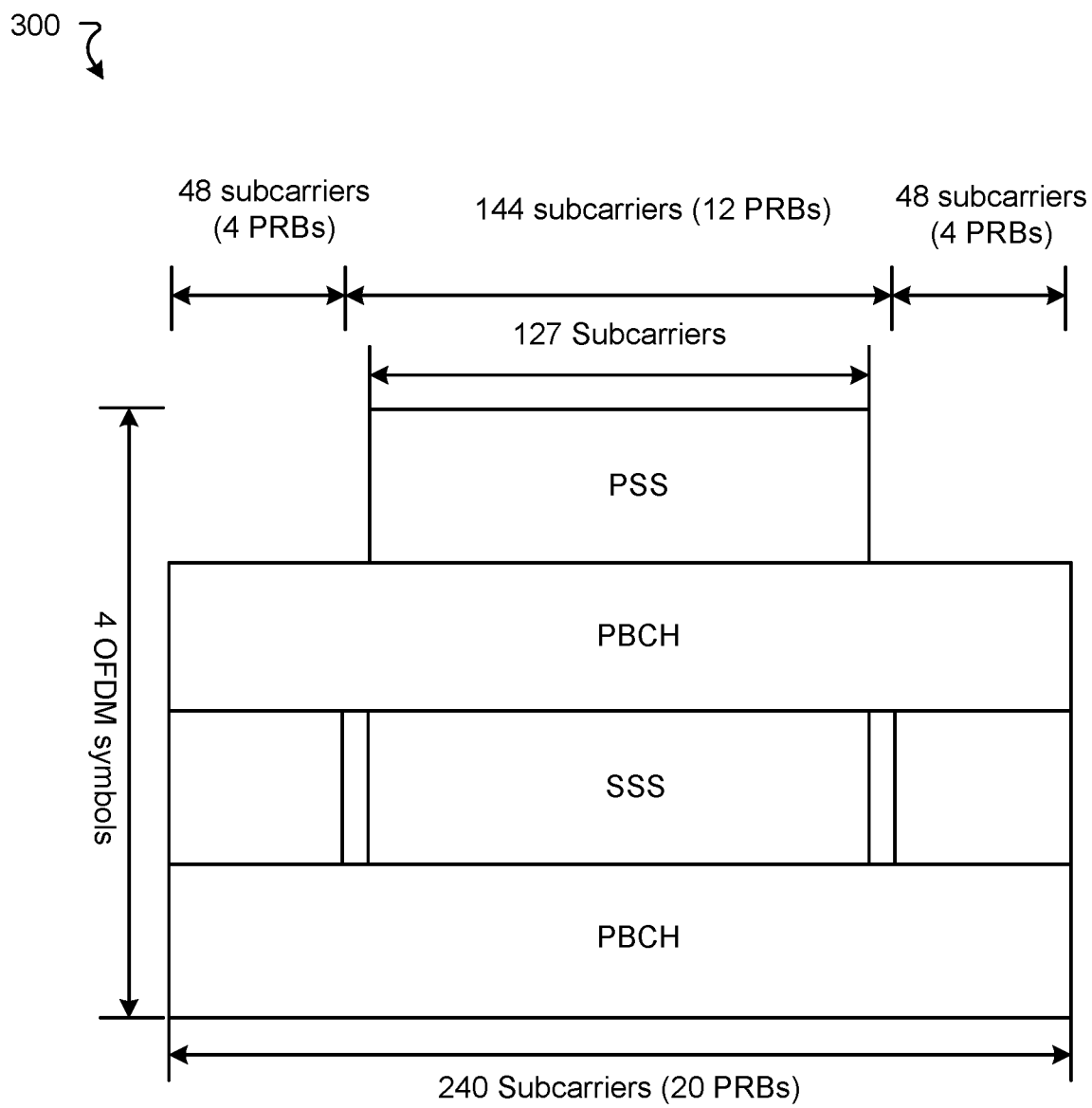
FIG. 3 is a diagram illustrating a synchronization signal block (SSB) as defined in NR in time and frequency domains, according to an example implementation.

A straightforward solution to correct this problem would be that the network does not schedule data on any OFDM symbols carrying SSBs. But this might lead to a large undesired capacity waste, which depends on the SSB period and the amount of the total carrier bandwidth. Along these lines, FIG. 3 is a diagram illustrating a synchronization signal block (SSB) 300 as defined in NR in time and frequency domains. In the time domain, the SSB occupies 4 OFDM symbols (as shown in FIG. 3). Nevertheless, considering that the SSB repetition rate is configurable as {5, 10, 20, 40, 80,160} ms, and that up to 64 SSBs are defined in FR2, this implies that in a worst case, 4*64=256 OFDM symbols may be wasted every 5 ms, which leads to a significant amount of wasted bandwidth. Although the typical values of the SSB period may be 10-20 ms, a smaller SSB period may be preferred in certain scenarios to enable the UEs in radio resource control (RRC) Idle to more quickly detect a new cell. Also, in the frequency domain, the SSB occupies a small fraction (240 subcarriers (SCS), i.e., 20 PRBs, Physical Resource Blocks, as shown in FIG. 3) out of the total carrier bandwidth (up to 100 MHz in NR). For a carrier bandwidth of 100 MHz, the ratio of SSB bandwidth (BW) (which depends on the SCS, 28.8 MHz at 120 KHz SCS) vs total carrier BW is small, and ~70% of the BW is wasted (for 120 KHz SCS).

In contrast to the above-described conventional approaches to managing measurement gaps for MPUEs, improved techniques of managing measurement gaps for MPUEs include identifying an idle time for the UE in a coordinated and network-controlled manner during which the UE is able to perform SSB/CSI-RS based measurements for a serving cell using non-serving panels. Such idle time is defined as an omitted operation time (i.e., an idle time of a certain pre-defined length) in which the network has to apply the scheduling restrictions in the SSBs' symbols to the UE. Note that currently as per the RAN4 requirements, the network must apply scheduling restrictions in all OFDM symbols carrying SSBs for all UEs in FR2 at any time (i.e., worst case scenario).

Advantageously, by enabling idle times, the network may apply scheduling restrictions only during these idle times and otherwise can omit such restrictions. In turn, this enables a full utilization of the entire carrier frequency/active BWP of the UE most of the times since most of the time a single serving panel can be expected to be used by the UE (i.e., there is no need for a scheduling restriction for the majority of the SSBs symbols).

For this purpose, an idle time configuration for panel measurements can be assigned to a MPUE that does not have the capability (or preference) to receive via multiple panels at a time. Such idle time configuration can be provisioned by means of a network configuration and can be optimized based on the UE capability related to multi-panels support and on additional UE assistance information related to multi-panels measurements. The activation of an idle time is triggered via a UE request/indication and the UE request for an idle time is permitted to be triggered autonomously at the UE (i.e., based on UE internal triggers).

In this context, the UE panel domain may still be hidden at the gNB; nevertheless, the network may become aware of when the UE is not reachable because it may be performing reception via a different panel than the serving panel (which is the best panel for the serving cell/beam) and, in turn, it can avoid scheduling the UE. That said, the associated wastage of radio resources may be reduced as the network need not apply scheduling restrictions outside idle times.

These idle times are meant for the UE to prepare (e.g., doing panel switch/activation) and perform measurements from a different panel (than the serving panel). For this purpose, the idle time may not be as frequent or long or having attributes such as a pattern as a measurements gap.

In some implementations, these idle times are configured based on the UE sending an indication of the UE capability related to multi-panel domain (MPUE capability)/preference indicating whether or at which extent the UE supports reception via multiple panels at a time.

In some implementations, the capability information may indicate whether the UE is capable to perform reception from more than one panel at a time or not.

In some implementations, the capability information may indicate how many panels are employed at the UEs.

In some implementations, the MPUE can provide assistance information to the network regarding multi-panel aspects, which can guide the network to determine how to assign UE-specific idle times.

This assistance information can be dependent on and indicate e.g., information related to the panel measurement approach employed by the UE (whether panel sweeping is performed via all panels or a reduced set of panels, so whether the UE prioritizes a full search or not; whether the UE performs a round-robin panel sweep approach or not, the necessary length for making a full beam and panel sweep or a reduced sweep), panel switching delays, the number of panels employed by the UE, etc.

This assistance information could indicate if UE supports more stringent measurement capabilities or requirements meaning less or more idle time is needed for a given UE depending on whether it supports more stringent capability or requirements.

This information can be used by the gNB to configure the idle times optimally for the UE.

In some implementations, an idle time configuration for panel measurements is determined by the network based on the UE capability, UE assistance information (if available), measurement types configured to the UE (CSI-RS vs RSRP/RSRQ/RSSI), and bandwidth of the UE's active BWP.

The idle time configuration comprises one or more idle times, each having an identifier and a length.

In some implementations, different idle times with different lengths are meant for performing measurements from a different combination of panels, where for example a first idle time is intended for a full sweep of beams+ all non-serving panels (i.e., measuring the relevant beams from all non-serving panels), one or more second idle time is intended for a reduced scanning (i.e., for measuring the relevant beams from a reduced set of non-serving panels (with a set length=1, 2, 3, . . . ).

In some implementations, the length of the idle times length can depend on the number of beams+panels to measure and the number of samples to collect per beam per panel.

In some implementations, the length of the idle times can depend on the type of measurements configured to the UE.

In some implementations, the configuration can depend on the UE mobility type and configure it only for low mobility UEs and/or if active BWP's bandwidth is above a threshold.

In some implementations, these idle times are configured only for the UE indicating the capability/preference of no reception via multiple panels at a time.

In some implementations, the network may apply scheduling restrictions to the UE in SSBs' symbols based on the UE indicating the need for an idle time to the network. The UE can determine autonomously whether and when to activate one idle time out of the configured ones upon satisfying an internal trigger criterion for non-serving panel measurements, if the corresponding allowance for autonomous activation trigger is provided by the gNB.

In some implementations, the UE can determine the need to activate an idle time among the ones configured by the network when measurements from non-serving panels are deemed necessary. Examples of internal triggers include:

A RSRP/RSRQ criterion from serving panel: e.g., RSRQ falls below threshold, etc.; this condition indicates that the serving panel may be deteriorating and a switch the serving panel to another panel may soon needed.

RF received signal power from a non-serving panel above a threshold; this condition can make the panel a potential candidate for changing the serving panel. In some implementations, RF measurements are done without gaps, without digital part, and without massive energy consumption.

The serving panel is being affected by MPE (Maximum Permissible Exposure) issue with the UL transmission of the current serving panel and thus, need to measure DL signal for other candidate panels.

In some implementations, upon a trigger being met, the UE sends an idle time activation request to the network, which may contain the idle time ID.

The activation request can be sent explicitly via a MAC CE.

The activation indication can be implicit upon the UE reporting a given measurement event.

If the allowance for autonomous activation was granted in connection to some measurement events that are configured by the network, the idle time activation request/indication can be implicit by sending the triggered measurement event reporting to the gNB. The event could be an existing measurements event (e.g., A2) or a new event introduced for this particular case (e.g., A3-like, "Serving Cell from a non-serving panel is offset better than Serving Cell from the currently serving panel). Upon receiving the event report, the idle time may be implicitly activated at the UE and network.

The autonomous triggering the need for an idle time may be valid as long as the UE complies with interruption requirements that can be pre-defined (e.g., written in a technical specification) for an idle time. The interruption requirements may indicate whether it is only the SSB's symbols that should be restricted from scheduling or more symbols (based on whether the UE need a panel switching delay to switch to a non-serving panel).

The UE may avoid panel switching if there is data in the buffer; accordingly, the UE may avoid sending an idle time activation request to the network if data is present.

In some implementations, in response, the network enables the associated scheduling restrictions in the SSB's symbols for the UE during the duration of the idle time. After the end of the idle time length, the network can omit the scheduling restriction for the UE.

In some implementations, the idle mode activation is determined at the UE based on network defined conditions dedicated for this purpose.

In some implementations, the network sends certain idle mode activation conditions and thresholds to the UE as part of the idle time configuration, for the UE to evaluate. Such criteria can be similar to the UE internal triggers described above.

In some implementations, upon satisfying any of the network-defined criteria, the MPUE reports the triggered condition which acts as an idle mode activation indication to the gNB.

In some implementations, in response, the gNB activates the scheduling restrictions to the UE during the duration of the idle time. After the end of the idle time period, the network can omit the scheduling restriction for the UE.

Figure 4:
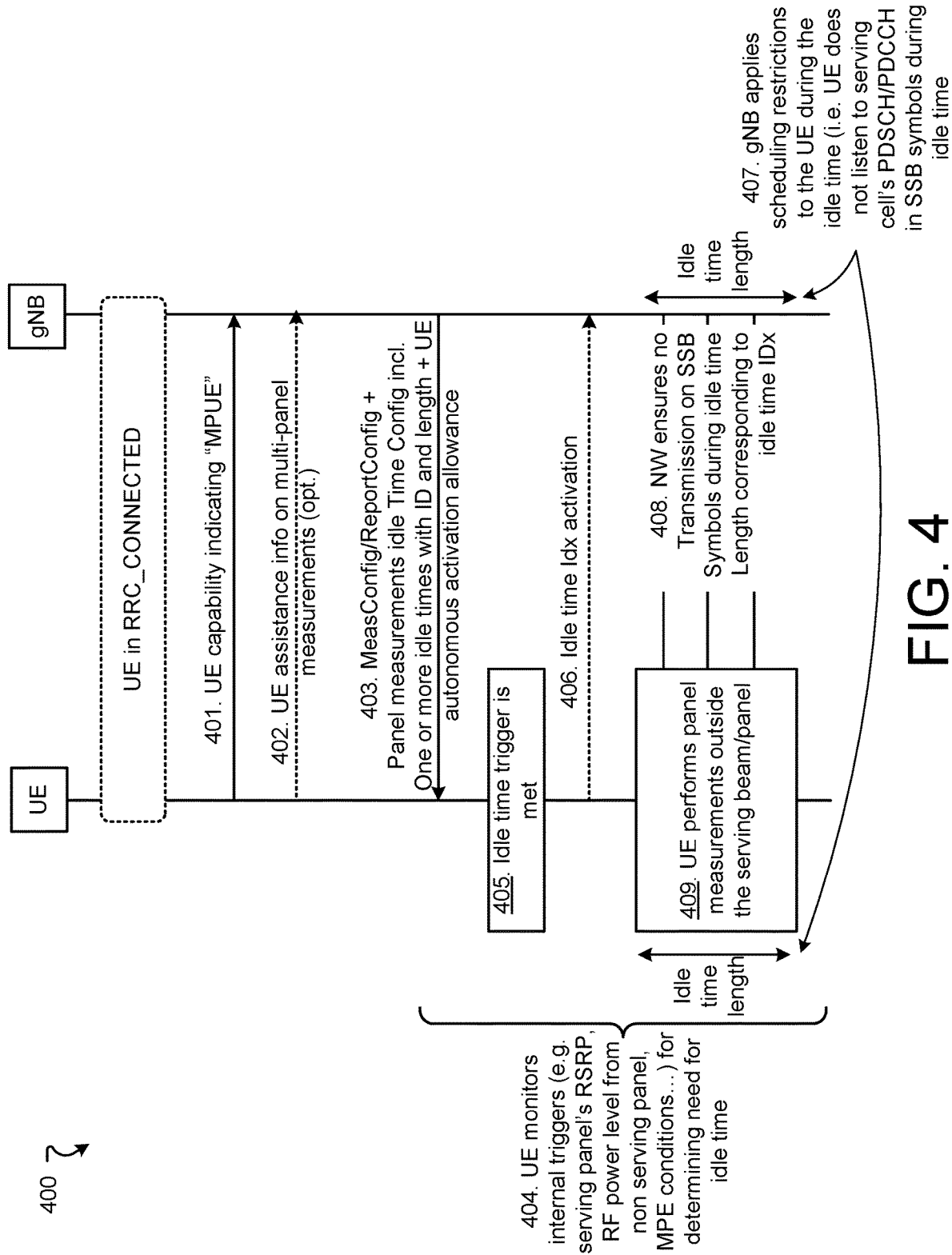
FIG. 4 is a sequence diagram illustrating a process of idle time configuration and activation of an MPUE, according to an example implementation.

FIG. 4 is a sequence diagram illustrating an example process 400 of idle time configuration and activation of an MPUE. The process 400 involves idle time configuration optimization based on UE needs. The network configures a time configuration for panel measurement to an MPUE for the purpose of performing multi-panel measurements based on UE capability/assistance related to panel aspects. As shown in FIG. 4, the UE has established an RRC connection with the gNB.

At 401, the UE transmits to the gNB an indication of the UE capability related to multi-panel domain (MPUE capability indicating whether or at which extent the UE supports reception via multiple panels at a time.

At 402, in some implementations, the UE transmits to the gNB assistance information regarding multi-panel aspects.

At 403, an idle time configuration for panel measurements is determined by the gNB based on the UE capability, UE assistance information (if available), measurement types configured to the UE (CSI-RS vs RSRP/RSRQ/RSSI), and bandwidth of the UE's active BWP.

At 404, the UE determines the need to activate an idle time among the ones configured by the gNB when measurements from a non-serving panels are deemed necessary.

At 405, the UE determines that the idle time trigger has been met.

At 406, upon a trigger being met, the UE sends an idle time activation request to the gNB.

At 407, in response, the gNB enables the associated scheduling restrictions in the SSB's symbols for the UE during the duration of the idle time.

At 408, the gNB ensures that no transmission on SSB symbols are sent to the UE during the idle time interval specified in the idle time activation request.

At 409, the UE performs the panel measurements outside of the serving antenna panel.

Figure 5:
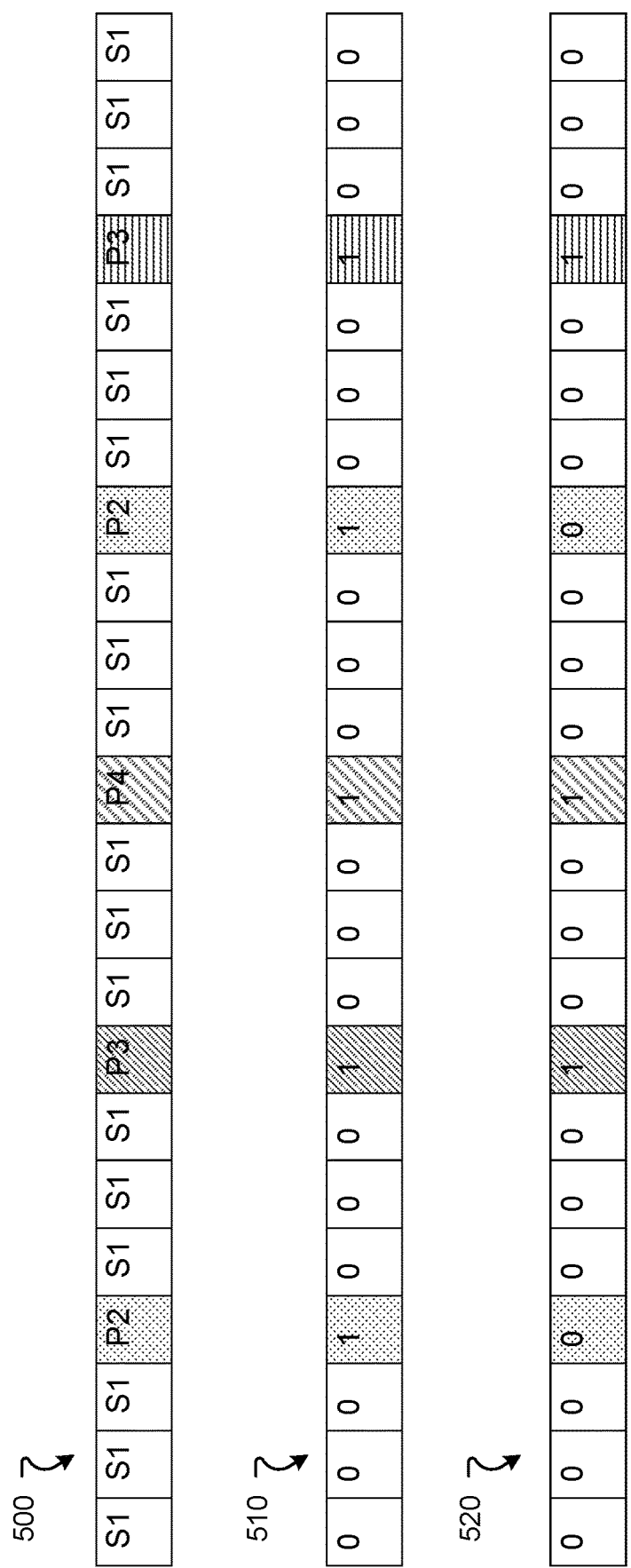
FIG. 5 is a diagram illustrating policies for multi-panel measurements following a recurring pattern, according to an example implementation.

In some implementations, the UE performs multi-panel measurements periodically according to a recurring pattern. That is, the UE may sweep the non-serving antenna panels over time. FIG. 5 is a diagram illustrating example policies 500, 510, and 520 for multi-panel measurements following a recurring pattern.

For policy 500, the UE is assumed to have four panels, a serving panel S1, and three non-serving panels P2, P3 and P4. Every box corresponds to one SSB cycle, e.g., 20 ms. Every SSB cycle contains 64 SSBs, each covering 4 OFDM symbols. As shown in FIG. 5, the pattern defined by policy 500 contains 24 SSB cycles, i.e., 480 ms. Panel P2 is measured on the SSBs in the 4th and 12th SSB cycle, P3 is measured in the 8th and 16th SSB cycle, and P4 is measured in the 12th and 24th SSB cycle. This pattern is repeated every 480 ms.

Depending on the UE capability, implementation and propagation conditions, the UE may not be able detect data in OFDM symbols when the UE measures the SSB on a non-serving antenna panel. If this is the case for every panel in this example, the UE would signal to the network as shown in FIG. 5 in policy 510. As illustrated in policy 510, "1" indicates an SSB cycle in which the UE will not listen to data in the OFDM symbols carrying SSB.

Note that even if a UE can only receive via one panel at the same time, it may happen that the UE is able to receive the serving cell e.g., via panel 2 (dotted) with decent strength as well (e.g., large angular spread at UE side, or the waves impinge between panels S1 and P2). In this case, the UE signals according to policy 520. The difference is that the UE indicates that it will listen to data in OFDM symbols carrying SSBs cycle 4 and 16.

These example policies demonstrate that neither the UE capability, nor the number of panels has to be made transparent to the network. The only relevant fact is whether or not the UE is listening to the data in SSB-carrying OFDM symbols. In some implementations, the UE also indicates to the network that it is also unable to listen to x OFDM symbols before the SSB-carrying OFDM symbols, and y OFDM symbols after the SSB-carrying OFDM symbols. A reason for that is that switching to a non-serving cell and back may consume non-negligible time. In this case, "1" in the above policies 510 and 520 for recurring patterns would not only refer to the SSB carrying OFDM symbols, but to a wider range.

In some implementations, the network receives the pattern information in a policy (e.g., policies 510, 520), and may apply scheduler restrictions (i.e., it will generate idle periods) for this UE. For example:

The network will not schedule data symbols (or control signalling symbols) to SSB-carrying symbols (or to a wider range) in those SSB cycles indicated by "1". This avoids wasting power/interference and increasing the block error rate.

The network will not apply such scheduler restrictions in SSB cycles indicated by "0". This avoids wasting capacity.

It is not relevant to the network whether the "0" is indicated because of capability, or because of receiving decent power on another serving panel, or because of other reasons, i.e., the terminal implementation can remain vendor specific.

In some implementations, it may not be necessary that the network informs the UE back about the applied scheduler restrictions (idle periods). The network may inform the UE, for example:

as a confirmation, with a time offset which instructs the UE to cyclically shift the pattern. Such a simple time offset might be a good instrument for the network to align the patterns of multiple UEs. In such a case, the network can maximize the capacity by avoiding any idle periods by avoiding the scheduling of UEs in timeslots when they would require an idle period (and scheduling other users instead), or if the network would like to apply the scheduler restrictions in other SSB cycles.

In some implementations, the network is free to decide scheduler restrictions. In some implementations, the network may decide to ignore the patterns and apply scheduler restrictions in all SSB cycle, or to not apply scheduler restrictions at all (wasting power/interference and increasing block error rate). Nevertheless, improved performance is achieved if the network considers the indicated pattern of the policy.

In some implementations, the UE decides to perform multi-panel measurements following a different pattern than the one indicated to the network. In that case, the UE may update the network by sending the new pattern. The UE may change the pattern if e.g., it switches the serving panel, if the propagation conditions changes, or due to any other reason. Although it is obviously desirable that the network and the UE apply the new pattern simultaneously, there will be few disadvantages if the UE applies the pattern shortly before or shortly after the network. Accordingly, it may not necessary to invest into perfect synchronization in this context.

Figure 6:
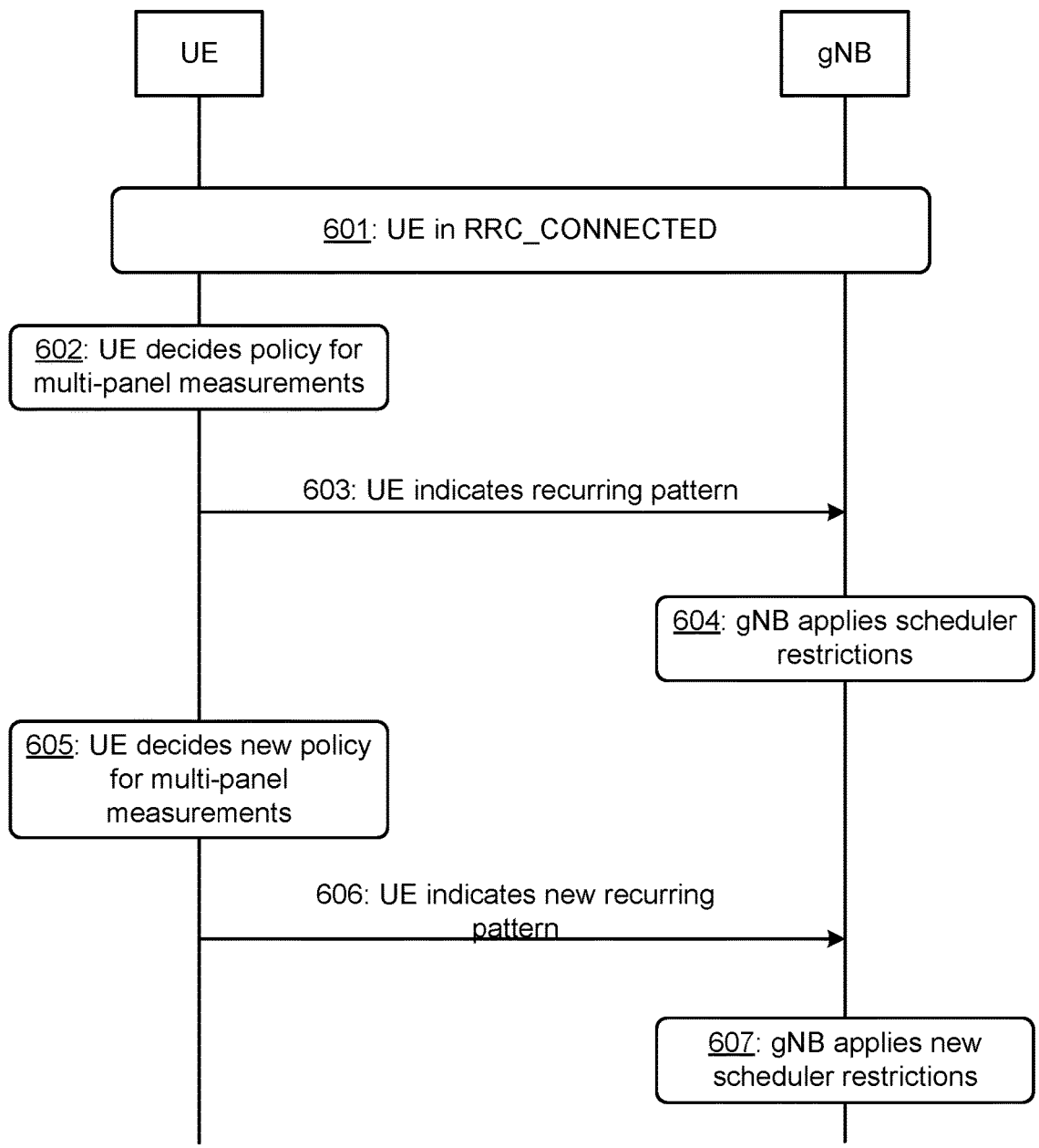
FIG. 6 is a sequence diagram illustrating a process of communicating policies following recurrent patterns, according to an example implementation.

FIG. 6 is a sequence diagram illustrating an example process 600 of communicating policies following recurrent patterns. A UE in connected mode decides a policy (e.g., a recurring pattern) for multi-panel measurements. The UE indicates a recurring pattern to the network (gNB). The gNB applies scheduler restrictions taking into account the indicated recurring pattern. When the UE decides a new policy with a new recurring pattern, it will indicate again to the gNB, and the gNB will apply a different scheduler restriction. In this example the signalling from network to UE is omitted since that signalling is not necessary in this context.

At 601, the UE and the gNB form a connection over RRC.

At 602 the UE in connected mode decides a policy (e.g., a recurring pattern) for multi-panel measurements.

At 603, the UE indicates a recurring pattern to the gNB.

At 604, the gNB applies scheduler restrictions taking into account the indicated recurring pattern.

At 605, the UE decides a new policy with a new recurring pattern.

At 606, the UE indicates the new policy to the gNB.

At 607, the gNB applies a different scheduler restriction.

Figure 7:
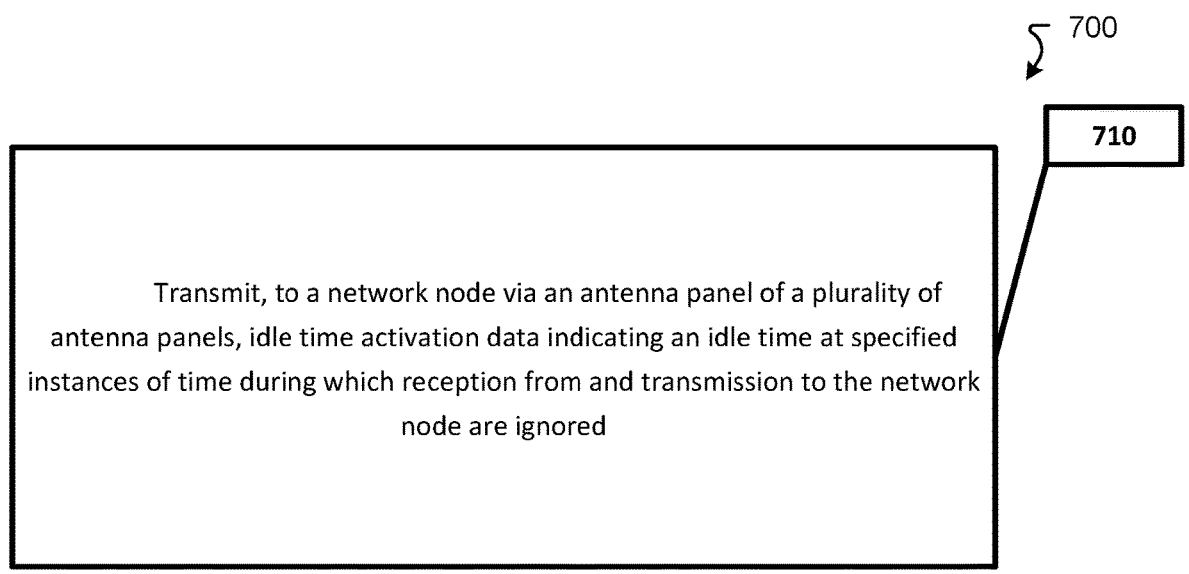
FIG. 7 is a flow chart illustrating a process of idle time configuration and activation of an MPUE according to an example implementation.

Example 1-1: FIG. 7 is a flow chart illustrating an example method 700 of managing measurement gaps for MPUEs. Operation 710 includes transmitting, to a network node via a plurality of antenna panels, idle time activation data indicating an idle time at specified instances of time during which reception from and/or transmission to the network node are ignored.

Example 1-2: According to an example implementation of Example 1-1, during the instances of time, perform measurements on a non-serving antenna panel of the plurality of antenna panels; and wherein outside of the instances of time, receive, from the network node and by a serving antenna panel of the plurality of antenna panels, data symbols and/or control symbols.

Example 1-3: According to an example implementation of Examples 1-1 or 1-2, wherein the method further includes transmitting, to the network node, capability data indicating a level of support for multiple antenna panels; and receiving, from the network node, idle time configuration data, the idle time configuration data specifying the instances of time during which reception from and transmission to the network node are ignored based on the level of support indicated in the capability data.

Example 1-4: According to an example implementation of Example 1-3, wherein the idle time configuration data includes at least one of interval data identifying at least one idle time interval, identification data identifying the at least one interval, and length data representing lengths of the one or more idle time intervals.

Example 1-5: According to an example implementation of Example 1-4, wherein the length of a first idle time interval is configured for measuring beams from at least one non-serving antenna panel of the plurality of antenna panels; and wherein the length of a second idle time interval is configured for measuring beams from a reduced subset of non-serving antenna panels of the plurality of antenna panels.

Example 1-6: According to an example implementation of any of Examples 1-3 to 1-5, wherein the method further comprises transmitting assistance data to the network node, the assistance data indicating at least one of information regarding a panel measurement approach or whether an increased or reduced idle time interval length is needed based on whether more stringent measurement capabilities are in use.

Example 1-7: According to an example implementation of Example 1-6, wherein the capability data further includes the assistance data; and wherein the instances of time during which reception from and transmission to the network node are ignored specified by the idle time configuration data is further based on the assistance data.

Example 1-8: According to an example implementation of any of Examples 1-1 to 1-7, wherein the method further comprises receiving, from the network node, trigger data indicating criteria at which the idle time is to be activated, the trigger data being based on network conditions of a network that includes the network node; and in response to the criteria being satisfied, transmitting the idle time activation data to the network node.

Example 1-9: According to an example implementation of Example 1-1, wherein the method further comprises obtaining an internal trigger indicating that the idle time is to be activated; and in response to obtaining the trigger, transmit the idle time activation data to the network node.

Example 1-10: According to an example implementation of any of Examples 1-1 to 1-9, wherein the instances of time are specified as a recurring pattern of a predefined length.

Example 1-11: According to an example implementation of Example 1-10, wherein the idle time activation data indicates a non-serving antenna panel that is configured to receive data symbols and/or control symbols in addition to the serving antenna panel.

Example 1-12: According to an example implementation of Examples 1-10 or 1-11, wherein the idle time activation data indicates a first number of symbols transmitted by the network node before the idle time and a second number of symbols after the idle time that will be ignored.

Example 1-13: According to an example implementation of any of Examples 1-10 to 1-12, wherein the method further comprises transmitting, to the network node, second idle time activation data indicating a second idle time at specified second instances of time during which data symbols and/or control symbols transmitted by the network node are ignored, wherein the second instances of time are specified as a second recurring pattern of a predefined length; during the second instances of time, performing measurements on a non-serving antenna panel of the plurality of antenna panels; and outside of the second instances of time, receiving, from the network node and by the serving antenna panel, data symbols and/or control symbols.

Example 1-14: An apparatus comprising means for performing a method of any of Examples 1-1 to 1-13.

Example 1-15: A computer program product including a non-transitory computer-readable storage medium and storing executable code that, when executed by at least one data processing apparatus, is configured to cause the at least one data processing apparatus to perform a method of any of Examples 1-1 to 1-13.

Figure 8:
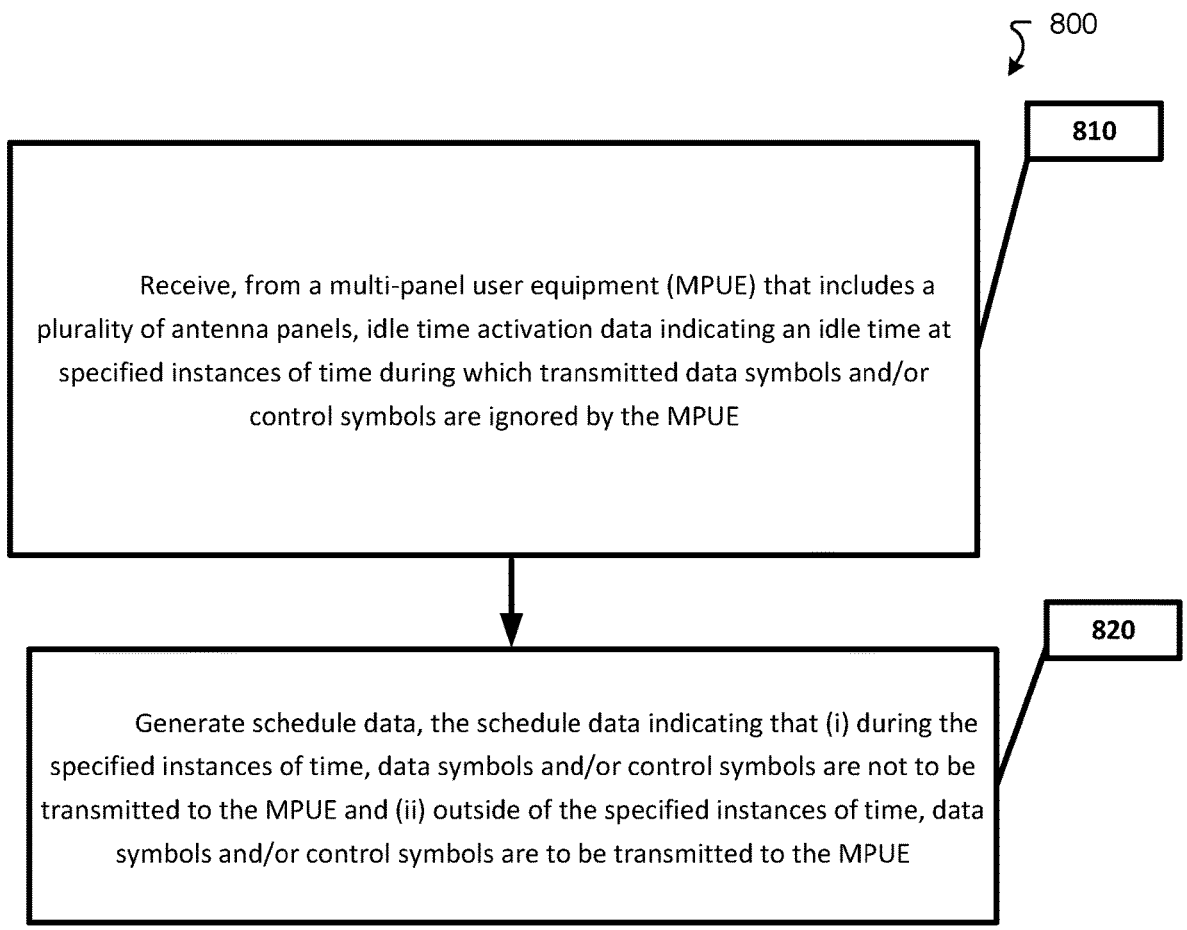
FIG. 8 is a flow chart illustrating a process of idle time configuration and activation of an MPUE according to an example implementation.

Example 2-1: FIG. 8 is a flow chart illustrating a process 800 managing measurement gaps for MPUEs. Operation 810 includes receiving, from a multi-panel user equipment (MPUE) that includes a plurality of antenna panels, idle time activation data indicating an idle time at specified instances of time during which transmitted data symbols and/or control symbols are ignored by the MPUE. Operation 820 includes generating schedule data, the schedule data indicating that (i) during the specified instances of time, data symbols and/or control symbols are not to be transmitted to the MPUE and (ii) outside of the specified instances of time, data symbols and/or control symbols are to be transmitted to the MPUE.

Example 2-2: According to an example implementation of Example 2-1, wherein the data symbols and/or control symbols include orthogonal frequency division multiplexed (OFDM) symbols carrying synchronization signal blocks (SSBs).

Example 2-3: According to an example implementation of Examples 2-1 or 2-2, wherein the data symbols and/or control symbols include orthogonal frequency division multiplexed (OFDM) symbols carrying synchronization signal blocks (SSBs) and additional OFDM symbols before and after the OFDM symbols carrying the SSBs.

Example 2-4: According to an example implementation of Examples 2-2 or 2-3, wherein the idle time activation data is transmitted over a media access channel control element (MAC CE).

Example 2-5: According to an example implementation of any of Examples 2-1 to 2-4, wherein the method further comprises receiving a report of a measured triggered event from the MPUE; and activating the idle time at the MPUE based on the report.

Example 2-6: According to an example implementation of Example 2-5, wherein the measured triggered event includes a determination that a serving cell from a non-serving antenna panel is offset better than the serving cell from the serving antenna panel.

Example 2-7: According to an example implementation of Examples 2-5 or 2-6, wherein the method further comprises determining whether the MPUE is compliant with pre-defined interruption requirements for the idle time, the interruption requirements indicating whether only synchronization signal block (SSB) symbols are restricted from scheduling.

Example 2-8: An apparatus comprising means for performing a method of any of Examples 2-1 to 2-7.

Example 2-9: A computer program product including a non-transitory computer-readable storage medium and storing executable code that, when executed by at least one data processing apparatus, is configured to cause the at least one data processing apparatus to perform a method of any of Examples 2-1 to 2-7.

LIST OF EXAMPLE ABBREVIATIONS

Figure 9:
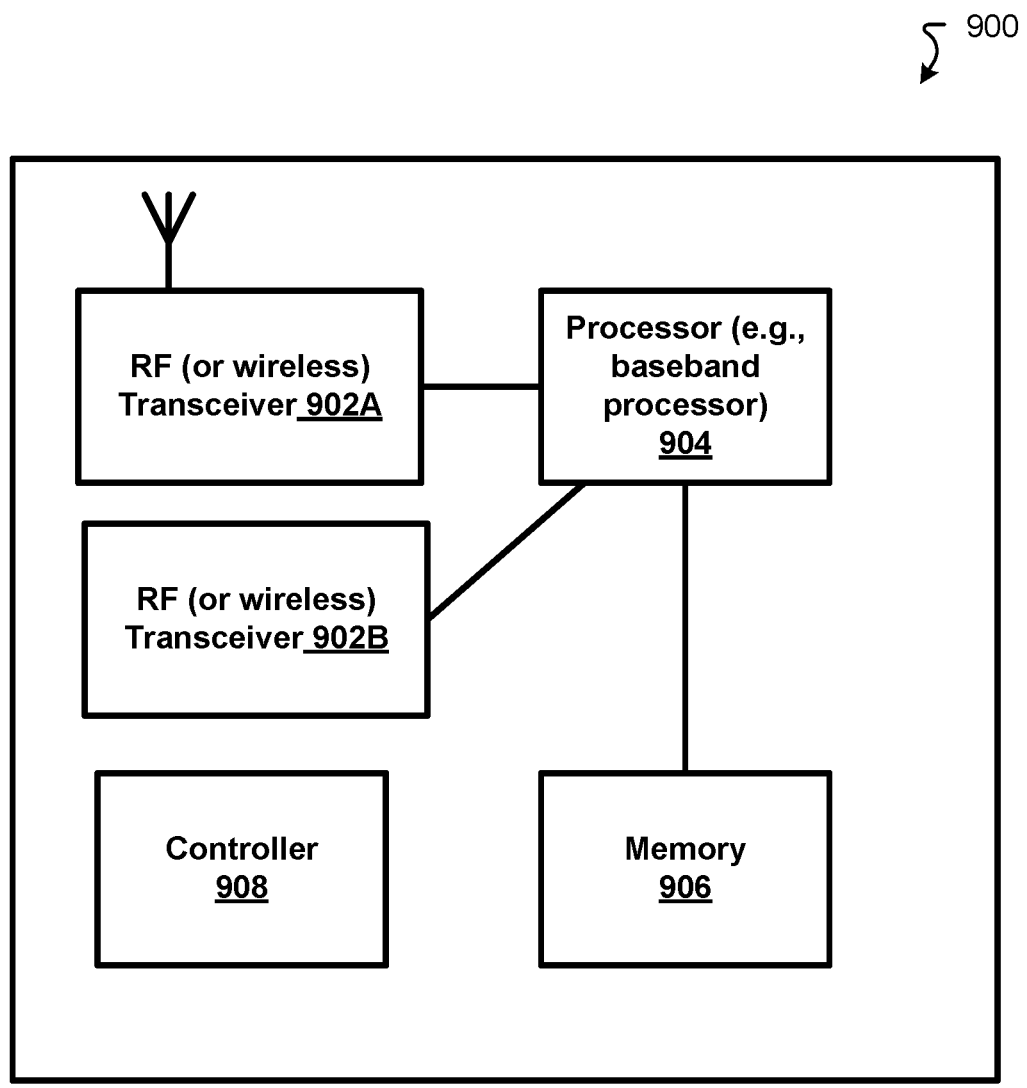
FIG. 9 is a block diagram of a node or wireless station (e.g., base station/access point, relay node, or mobile station/user device) according to an example implementation.

BWP Bandwidth Part
CP Control Plane
CQI Channel Quality Indicator
CSI Channel-state information
CSI-RS Channel-State Information Reference Signals
DCI Downlink Control Channel
DRX Discontinuous reception
gNB Next Generation NodeB
I-RNTI Inactive-RNTI
NG-5G-S-TMSI 5G S-Temporary Mobile Subscriber Identity
NG-RAN New Generation—Radio Access Network
NW Network
OFDM Orthogonal frequency-division multiplexing
PCell Primary Cell
PDCCH Physical Downlink Control Channel
PDSCH Physical downlink shared channel
PO Paging Occasion
PRACH Physical Random Access Channel
PRB Physical resource block
PUCCH Physical Uplink Control Channel
PUSCH Physical Uplink shared channel
QCL Quasi-Colocation
RNAU RAN Notification Area Update
RNTI Radio Network Temporary Identifier
RRC Radio resource control protocol
RRM Radio resource management
RSRP Reference Signal Received Power
RSRQ Reference Signal Received Quality
SI System Information
SIB System Information Block
SINR Signal-to-Interference and noise ratio
SpCell Special Cell FIG. 9 is a block diagram of a wireless station (e.g., AP, BS, e/gNB, NB-IoT UE, UE or user device) 900 according to an example implementation. The wireless station 900 may include, for example, one or multiple RF (radio frequency) or wireless transceivers 902A, 902B, where each wireless transceiver includes a transmitter to transmit signals (or data) and a receiver to receive signals (or data). The wireless station also includes a processor or control unit/entity (controller) 904 to execute instructions or software and control transmission and receptions of signals, and a memory 906 to store data and/or instructions.

Processor 904 may also make decisions or determinations, generate slots, subframes, packets or messages for transmission, decode received slots, subframes, packets or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9 such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:
at least one processor; and
at least one memory including computer program code;
the at least one memory and the computer program code configured to cause the apparatus at least to:
transmit, to a network node via an antenna panel of a plurality of antenna panels, idle time activation data indicating an idle time at specified instances of time during which reception from and/or transmission to the network node are ignored.

2. The apparatus as in claim 1, wherein during the instances of time, perform measurements on a non-serving antenna panel of the plurality of antenna panels; and
wherein outside of the instances of time, receive, from the network node and by a serving antenna panel of the plurality of antenna panels, data symbols and/or control symbols.

3. The apparatus as in claim 1, wherein the at least one memory and the computer program code are further configured to cause the apparatus at least to:
transmit, to the network node, capability data indicating a level of support for multiple antenna panels; and
receive, from the network node, idle time configuration data, the idle time configuration data specifying the instances of time during which reception from and transmission to the network node are ignored based on the level of support indicated in the capability data.

4. The apparatus as in claim 3, wherein the idle time configuration data includes at least one of interval data identifying at least one idle time interval, identification data identifying the at least one interval, and length data representing lengths of the one or more idle time intervals.

5. The apparatus as in claim 4, wherein the length of a first idle time interval is configured for measuring beams from at least one non-serving antenna panel of the plurality of antenna panels; and
wherein the length of a second idle time interval is configured for measuring beams from a reduced subset of non-serving antenna panels of the plurality of antenna panels.

6. The apparatus as in claim 3, wherein the at least one memory and the computer program code are further configured to cause the apparatus at least to:
transmit assistance data to the network node, the assistance data indicating at least one of information regarding a panel measurement approach or whether an increased or reduced idle time interval length is needed based on whether more stringent measurement capabilities are in use.

7. The apparatus as in claim 6, wherein the capability data further includes the assistance data; and
wherein the instances of time during which reception from and transmission to the network node are ignored specified by the idle time configuration data is further based on the assistance data.

8. The apparatus as in claim 1, wherein the at least one memory and the computer program code are further configured to cause the apparatus at least to:
receive, from the network node, trigger data indicating criteria at which the idle time is to be activated, the trigger data being based on network conditions of a network that includes the network node; and
in response to the criteria being satisfied, transmit the idle time activation data to the network node.

9. The apparatus as in claim 1, wherein the at least one memory and the computer program code are further configured to cause the apparatus at least to:
obtain an internal trigger indicating that the idle time is to be activated; and
in response to obtaining the trigger, transmit the idle time activation data to the network node.

10. A method, comprising:
transmitting, to a network node via a plurality of antenna panels, idle time activation data indicating an idle time at specified instances of time during which reception from and/or transmission to the network node are ignored;
during the instances of time, performing measurements on a non-serving antenna panel of the plurality of antenna panels; and
outside of the instances of time, receiving, from the network node and by a serving antenna panel of the plurality of antenna panels, data symbols and/or control symbols.

11. The method as in claim 10, wherein the instances of time are specified as a recurring pattern of a predefined length.

12. The method as in claim 11, wherein the idle time activation data indicates a non-serving antenna panel that is configured to receive data symbols and/or control symbols in addition to the serving antenna panel.

13. The method as in claim 11, wherein the idle time activation data indicates a first number of symbols transmitted by the network node before the idle time and a second number of symbols after the idle time that will be ignored.

14. The method as in claim 11, further comprising:
transmitting, to the network node, second idle time activation data indicating a second idle time at specified second instances of time during which data symbols and/or control symbols transmitted by the network node are ignored, wherein the second instances of time are specified as a second recurring pattern of a predefined length;
during the second instances of time, performing measurements on a non-serving antenna panel of the plurality of antenna panels; and
outside of the second instances of time, receiving, from the network node and by the serving antenna panel, data symbols and/or control symbols.

15. A computer program product including a non-transitory computer-readable storage medium and storing executable code that, when executed by at least one data processing apparatus, is configured to cause the at least one data processing apparatus to perform a method of claim 10.

16. An apparatus comprising means for performing a method according to claim 10.

17. An apparatus, comprising:
at least one processor; and
at least one memory including computer program code;
the at least one memory and the computer program code configured to cause the apparatus at least to:
receive, from a multi-panel user equipment (MPUE) that includes a plurality of antenna panels, idle time activation data indicating an idle time at specified instances of time during which transmission to and/or reception from the apparatus are ignored by the MPUE; and
generate schedule data, the schedule data indicating that (i) during the specified instances of time, data symbols and/or control symbols are not to be transmitted to the MPUE and (ii) outside of the specified instances of time, data symbols and/or control symbols are to be transmitted to the MPUE.

18. The apparatus as in claim 17, wherein the data symbols and/or control symbols include orthogonal frequency division multiplexed (OFDM) symbols carrying synchronization signal blocks (SSBs).

19. The apparatus as in claim 17, wherein the data symbols and/or control symbols include orthogonal frequency division multiplexed (OFDM) symbols carrying synchronization signal blocks (SSBs) and additional OFDM symbols before and after the OFDM symbols carrying the SSBs.

20. The apparatus as in claim 17, wherein the idle time activation data is transmitted over a media access channel control element (MAC CE).

21. The apparatus as in claim 17, wherein the at least one memory and the computer program code configured to receive the idle time activation data are further configured to cause the apparatus at least to:
   receive a report of a measured triggered event from the MPUE; and
   activating the idle time at the MPUE based on the report.

22. The apparatus as in claim 21, wherein the measured triggered event includes a determination that a serving cell from a non-serving antenna panel is offset better than the serving cell from the serving antenna panel.

23. The apparatus as in claim 21, wherein the at least one memory and the computer program code are further configured to cause the apparatus at least to:
   determine whether the MPUE is compliant with predefined interruption requirements for the idle time, the interruption requirements indicating whether only synchronization signal block (SSB) symbols are restricted from scheduling.

24. A method, comprising:
   receiving, by a network node from a multi-panel user equipment (MPUE) that includes a plurality of antenna panels, idle time activation data indicating an idle time at specified instances of time during transmission to and/or reception from the network node are ignored by the MPUE; and
   generating schedule data, the schedule data indicating that (i) during the specified instances of time, data symbols and/or control symbols are not to be transmitted to the MPUE and (ii) outside of the specified instances of time, data symbols and/or control symbols are to be transmitted to the MPUE.

* * * * *